United States Patent
Pestoor et al.

(10) Patent No.: US 10,077,902 B2
(45) Date of Patent: Sep. 18, 2018

(54) ADAPTER FOR A FLUE GAS OUTLET

(71) Applicant: M & G Group B.V., Assen (NL)

(72) Inventors: Ietse Jan Pestoor, Ezinge (NL); Jos Wolffram, Groningen (NL)

(73) Assignee: M & G GROUP B.V, Assen (NL)

( * ) Notice: Subject to any disclaimer, the term of this patent is extended or adjusted under 35 U.S.C. 154(b) by 482 days.

(21) Appl. No.: 14/791,530

(22) Filed: Jul. 6, 2015

(65) Prior Publication Data

US 2016/0003475 A1 Jan. 7, 2016

(30) Foreign Application Priority Data

Jul. 7, 2014 (NL) ..................................... 2013138

(51) Int. Cl.
*F23L 17/12* (2006.01)
*F23J 13/04* (2006.01)

(52) U.S. Cl.
CPC ............... *F23L 17/12* (2013.01); *F23J 13/04* (2013.01); *F23J 2213/202* (2013.01)

(58) Field of Classification Search
CPC ....... F23L 17/12; F23J 13/04; F23J 2213/202; F23J 2213/203; F23J 2213/20
USPC .................................................. 126/317, 315
See application file for complete search history.

(56) References Cited

U.S. PATENT DOCUMENTS

| 44,092 | A | * | 9/1864 | Hay | ......................... F23J 13/04 126/315 |
| 2,841,419 | A | * | 7/1958 | Jay | ...................... F16L 27/1021 285/136.1 |
| 4,763,695 | A | * | 8/1988 | Dooley | ................. F16L 21/005 138/109 |
| 5,700,039 | A | * | 12/1997 | Manning | ............. A01M 13/006 285/148.17 |
| 6,026,803 | A | * | 2/2000 | Wawrla | ................... F16L 21/08 126/307 R |
| 6,857,808 | B1 | * | 2/2005 | Sugimoto | ............. E04B 1/2403 248/903 |

(Continued)

FOREIGN PATENT DOCUMENTS

BE 901 076 A2 3/1985
DE 10 2008 055828 A1 5/2010

(Continued)

OTHER PUBLICATIONS

NL Search Report, dated Mar. 3, 2015, from corresponding NL application.

*Primary Examiner* — Alfred Basichas
(74) *Attorney, Agent, or Firm* — Young & Thompson

(57) ABSTRACT

Adapter for a flue gas outlet with a first end (2), a second end (4), and a central passageway (6) extending there between. The second end (4) has at least two interconnected cylinder shaped walls (8, 10, 12) having different internal diameters (d1, d2, d3), each cylinder shaped wall (8,10,12) being arranged for sealed engagement with a corresponding pipe to be inserted into the adapter (1). An internal diameter of the at least two cylinder shaped walls (8,10,12) decreases with increased insertion depth (h) as measured from the second end (4) toward the first end (2). The at least two cylinder shaped walls (8,10,12) are eccentrically disposed and mutually tangent in a longitudinal direction of the adapter (1). The adapter (1) further has a pipe securing member (14) circumferentially disposed at the second end (4).

15 Claims, 3 Drawing Sheets

(56) References Cited

U.S. PATENT DOCUMENTS

| | | | |
|---|---|---|---|
| 2002/0096882 A1* | 7/2002 | Stripe | F16L 33/04 285/253 |
| 2005/0052018 A1* | 3/2005 | Pichotta | F16L 25/0018 285/9.1 |
| 2015/0115596 A1* | 4/2015 | Donnelly | F16L 5/025 285/42 |

FOREIGN PATENT DOCUMENTS

| | | | |
|---|---|---|---|
| DE | 102010049434 A1 * | 4/2012 | F16L 21/005 |
| EP | 0 672 866 A2 | 9/1995 | |

* cited by examiner

ADAPTER FOR A FLUE GAS OUTLET

FIELD OF THE INVENTION

The present invention relates to an adapter for a flue gas outlet, in particular a multi-diameter adapter for connecting pipes having different diameters.

PRIOR ART

European patent application EP 0 672 866 A2 discloses an adapter for connecting two flue gas pipes having different inner and outer diameters. The adapter comprises an elastic rubber-like seal to be inserted in a first pipe having a larger inner diameter than an outer diameter of a second pipe. The seal comprises an aperture for receiving the second pipe such that the seal provides a tight and sealed compression fit between the first and second pipe.

SUMMARY OF THE INVENTION

The present invention seeks to provide an improved adapter for a flue gas outlet capable of receiving and safely securing an outlet pipe with one of multiple pipe diameters to the flue gas outlet.

According to the present invention an adapter of the type defined in the preamble is provided, wherein the adapter comprising a first end, a second end, and a central passageway extending there between, the second end comprising at least two interconnected cylinder shaped walls having different internal diameters, each cylinder shaped wall being arranged for sealed engagement with a corresponding pipe to be inserted into the adapter, wherein an internal diameter of the at least two cylinder shaped walls decreases with increased insertion depth as measured from the second end toward the first end, wherein the at least two cylinder shaped walls are eccentrically disposed and mutually tangent in a longitudinal direction of the adapter, and wherein the adapter further comprises a pipe securing member circumferentially disposed at the second end.

The adapter of the present invention is advantageous as it is not only a multi-diameter pipe adapter for improved versatility, but it also allows secure fastening of an inserted pipe for meeting stringent safety standards as well as regulatory requirements in many countries in the world.

In an embodiment, the pipe securing member is mutually tangent to each of the at least two cylinder shaped walls in the longitudinal direction, thereby allowing to secure an inserted pipe by a single pipe securing member for a plurality of pipe diameters.

In a further embodiment, securing the smallest and largest pipe diameters in the adapter of the present invention is advantageously achieved by the pipe securing member when it is disposed at a cylinder shaped wall having the largest possible inner diameter. In this way the largest but also the smallest possible diameter of a pipe to be inserted can accommodated and the inserted pipe can be safely secured.

In a practical embodiment, the pipe securing member may be a screw band clamp (e.g. a "hose clamp"), which is configured for clamping a range of pipe diameters so that a single pipe securing member can be used instead of a separate pipe securing member for each different pipe diameter. In an embodiment the pipe securing member may also be a spring clamp for providing a very fast secure connection of an inserted pipe in the adapter.

When installing the adapter in a building at e.g. a remote and possibly difficult to access location with specialized tools that may require electrical power, the pipe securing member may comprises a manually operable tightening member for manual tightening the pipe securing member. To that end, in an embodiment the tightening member is externally accessible, which also allows tightening adjustments to be made once the adapter is already installed.

According to the invention, in an embodiment the tightening member is disposed at a point of tangency of the at least two cylinder shaped walls. In this embodiment the tightening member may remain stationary with respect to the adapter at the point of tangency yet allow the pipe securing member to change its tightening diameter when operating the tightening member.

In addition to the pipe securing member, an inserted pipe in the adapter may be further secured and sealed thereto in a gas tight fashion by an embodiment wherein each of the at least two cylinder shaped walls comprises a sealing member having an inner diameter smaller than an outer diameter of a pipe to be inserted in the adapter. In many embodiments the sealing member comprises a single or double sealing ring in which a pipe can be inserted. The sealing member firmly fits around an inserted pipe and provides a gas-tight seal around the inserted pipe.

In a further embodiment, a mounting flange may be disposed between the first end and the second end. This embodiment allows the adapter of the present invention to be easily mounted on and through e.g. a roof decking or wall. For example, the adapter may extend through a roof decking and mounted to an inner (or outer) surface thereof with the mounting flange. In order to avoid cold drafts through small openings between the roof decking or wall, the mounting flange of the adapter may further comprise a flange sealing member. In a typical embodiment, the flange sealing member is a sealing ring disposed around the first end of the adapter at the mounting flange. In particular, this embodiment allows the sealing member to be tightly fitted between e.g. the roof decking or wall and the mounting flange, thereby ensuring a tight seal that prevents drafts through small openings between the adapter and the roof decking or wall.

In case an inserted pipe is not exactly aligned with the adapter, the adapter of the present invention may further comprise a plurality of externally disposed reinforcement ribs to prevent excessive bending and possible rupture of the adapter. Also, the reinforcement ribs may further ensure that the mounting flange is strengthened, so that the adapter remains aligned with e.g. the roof decking or wall in case an inserted pipe imposes significant forces and moments on the adapter.

SHORT DESCRIPTION OF DRAWINGS

The present invention will be discussed in more detail hereinafter based on a number of exemplary embodiments with reference to the drawings, in which FIG. 1 shows a cross sectional view of an embodiment of an adapter according to the present invention;

DETAILED DESCRIPTION OF EXEMPLARY EMBODIMENTS

Flue gas outlets come in various shapes and forms and are typically installed through walls or roofs. Many prior art flue gas outlets allow for a pipe to be slidably inserted, often through some sort of sleeve or socket type member for receiving a corresponding pipe therein. For each diameter pipe to be used for venting flue gases, a separate flue gas outlet is typically needed having the proper sleeve or socket size. Also, many flue gas outlets do not actively secure the pipe inserted therein, as a tight friction based fit is generally believed to be sufficient for securing the pipe to the flue gas outlet. However, in some countries such flue gas outlets may not be allowed for regulatory reasons.

In view of the above there is a need for an adapter allowing multiple pipe diameters to be used for a single flue gas outlet. For safety and regulatory reasons there is a further need for an adapter capable of actively securing a pipe inserted into the adapter independent the diameter of an inserted pipe.

Figure 1:
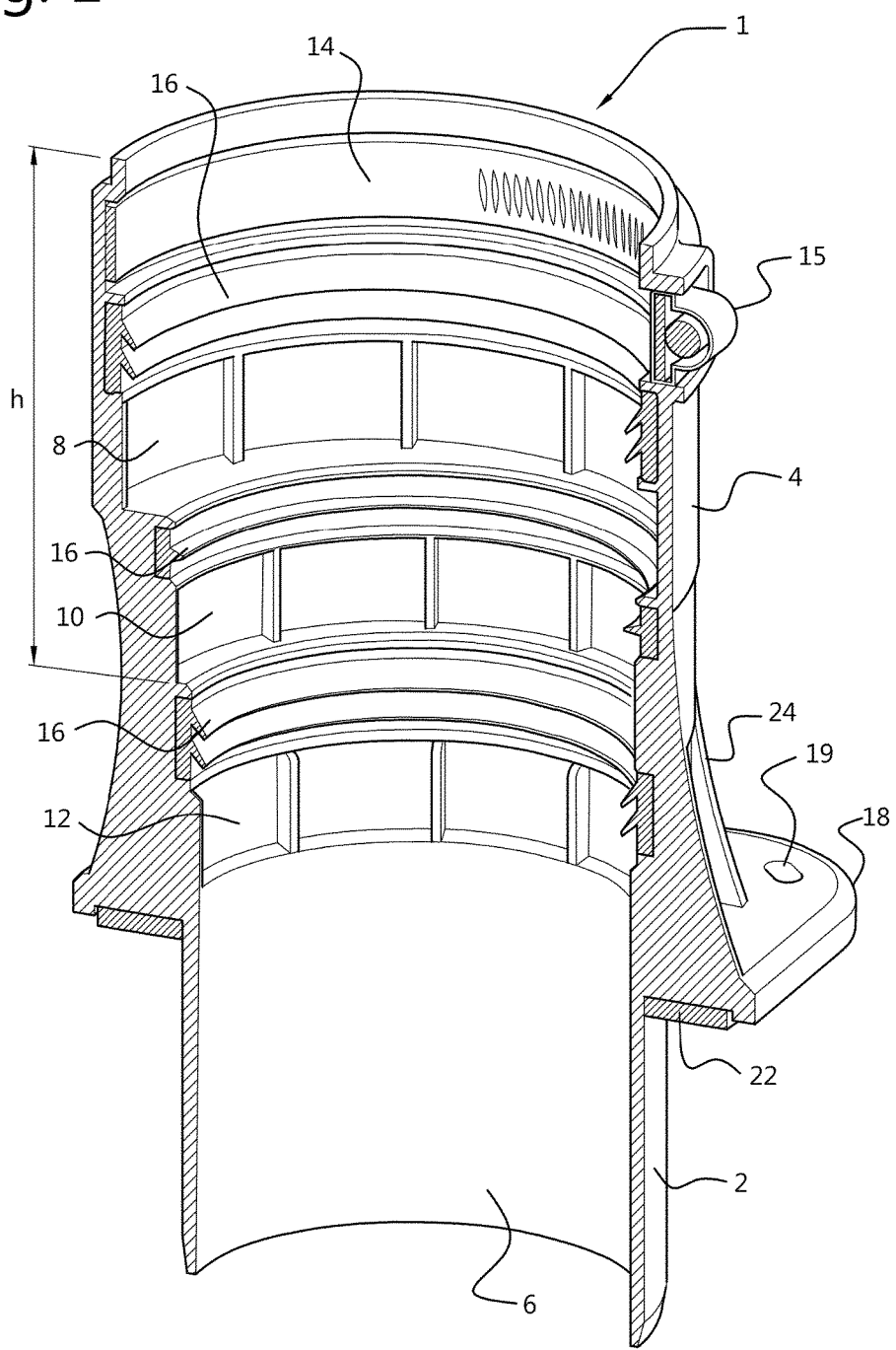

FIG. 1 depicts a cross sectional view of an embodiment of an adapter according to the present invention. In the embodiment shown, the adapter comprises a first end 2 and a second end 4, and a passageway 6 extending there between. The first end 2 may be typically installed through e.g. a wall or roof decking and the like. The second end 4 comprises a plurality or at least two interconnected cylinder shaped walls 8, 10, 12 having different internal diameters. The at least two interconnected cylinder shaped walls 8, 10, 12 comprise at least in part the passageway 6 extending through the adapter 1. Each cylinder shaped wall 8, 10, 12 is arranged for sealed engagement, e.g. gas tight engagement, with a corresponding pipe to be inserted into the adapter 1. The sealed engagement is substantially gas tight, so that no gas moving through an inserted pipe and the passageway 6 is able to escape along the sealed engagement.

According to the invention, the adapter 1 comprises a stepped profile of a plurality of inner diameters defined by the least two cylinder shaped wall 8, 10, 12, wherein an internal diameter of the at least two cylinder shaped walls 8, 10, 2 decreases with increased insertion depth h as measured from the second end 4 toward the first end 2. So when a pipe is to be inserted in the adapter 1 with an increased outer diameter, then the corresponding insertion depth h of the pipe decreases.

Further, the at least two cylinder shaped walls 8, 10, 12 are eccentrically disposed and mutually tangent in a longitudinal direction of the adapter 1. That is, the at least two cylinder shaped walls 8, 10, 12 define at least two eccentrically projected circles onto a transverse plane of the adapter 1, wherein the at least two projected circles are internally tangent, also known as "kissing" or internally tangent circles. So the at least two cylinder shaped walls 8, 10,12 are eccentrically disposed in the adapter 1 but are aligned at their circumference when viewed along a longitudinal axis of the adapter 1.

In typical embodiments, an inner diameter of each of the at least two cylinder shaped walls 8,10,12 is larger than 40 mm and smaller than 400 mm, which allows for regularly used pipe sizes in e.g. flue gas outlet applications. In a further embodiment, the range of diameters may be between 50 and 300 mm. In an embodiment, as e.g. depicted in FIG. 2, the adapter 1 may comprise a first inner diameter d1 of 100 mm, a second inner diameter d2 of 80 mm, and a third inner diameter d3 of 60 mm for accommodating three often used pipe diameters.

Advantageously, particularly in view of safety and regulatory requirements, the adapter 1 further comprises a pipe securing member 14 circumferentially disposed at the second end 4. The pipe securing member 14 is configured to secure an inserted pipe for each diameter that fits into the adapter 1, and so the pipe securing member 14 is suitable for securing pipes of different diameters so as to comply with safety and regulatory requirements.

Because of the eccentric arrangement and mutual tangency of the at least two cylinder shaped walls 8, 10, 12 in a longitudinal direction of the adapter 1, a longitudinal support axis can be defined against which an inserted pipe can be pushed by the pipe securing member 14, irrespective of the diameter of the inserted pipe. Thus, the adapter 1 of the present invention is a multi-diameter pipe adapter 1 providing secure fastening of an inserted pipe for meeting the most stringent safety standards as well as regulatory requirements. Typically, the adapter 1 may be made of plastic, e.g. PP, PVC, aluminium or steel, which are durable materials that are readily available.

Figure 2:
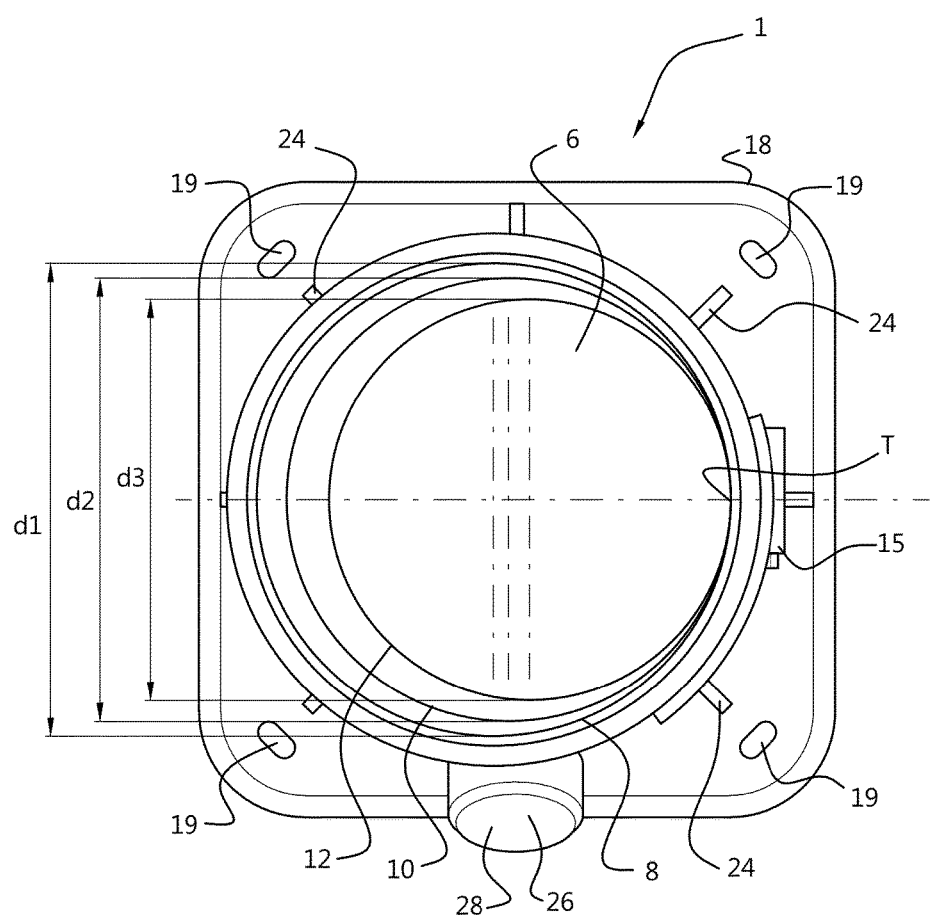
FIG. 2 shows a top view of an adapter according to the present invention.

FIG. 2 shows a top view of the adapter 1 according to the present invention, wherein the mutual tangency of the at least two cylinder shaped walls 8, 10, 12 in a longitudinal direction of the adapter 1 is clearly shown. This eccentric and mutual tangent arrangement of the at least two cylinder shaped walls 8, 10, 12 is particular advantageous for allowing an inserted pipe to be safely secured to the adapter 1 using a single pipe securing member 14. To that end, in an advantageous embodiment the pipe securing member 14 is mutually tangent to each of the at least two cylinder shaped walls 8,10,12 in the longitudinal direction. In this embodiment the pipe securing member 14 is configured to pull an inserted pipe against a longitudinal point or line T of tangency of the adapter 1 as viewed from a top view as depicted.

In order to allow for a largest possible pipe to be inserted and safely secured to the adapter 1, the pipe securing member 14 may be disposed at a cylinder shaped wall 8, 10, 12 having a largest internal diameter d1. In a practical embodiment, the pipe securing member 14 may be a screw band clamp. The screw band clamp is advantageous as it is readily available, easy to replace if needed, and capable of securing various sizes of an inserted pipe with equal clamping force if so desired. In an alternative embodiment the pipe securing member 14 may even be a spring clamp. This embodiment is advantageous as it allows for a straightforward clip-on clamping action on an inserted pipe, provided the spring action remains sufficiently high for a smallest internal diameter d3 of the adapter 1.

Further, in an embodiment, the pipe securing member 14 comprises a manually operable tightening member 15, thereby allowing for easy installation and securing attachment of an inserted pipe in the adapter 1. No special tools are required other than e.g. a screw driver, wrench, pliers and the like. It is even conceivable that the manually operable tightening member 15 is configured to allow for tightening by hand through e.g. a butterfly nut and the like. In an advantageous and particularly convenient embodiment, the tightening member 15 may be externally accessible 15 to facilitate securing an inserted pipe to the adapter 15. This avoids securing an inserted pipe through e.g. the first end 2 of the adapter 1.

According to the invention, the at least two cylinder shaped walls 8, 10, 12 are eccentrically disposed and mutually tangent in a longitudinal direction of the adapter 1 as depicted in FIG. 2. In order to allow for a single tightening member 15 capable of securing each pipe corresponding to an internal diameter d1, d2, d3 of the at least two cylindrical shaped walls 8, 10, 12, the tightening member 15 may be disposed at a point of tangency of the at least two cylinder shaped walls 8,10,12. This embodiment is advantageous as the point or line of tangency T as depicted in FIG. 2 is shared among each of the internal diameters d1, d2, 3 in a longitudinal direction of the adapter 1. Hence, the tightening member 15 may remain statically disposed relative to the point or line of tangency T while being able to securely fix each inserted pipe against the point or line of tangency T.

As shown in FIG. 1, according to an embodiment each of the at least two cylinder shaped walls 8,10,12 may comprises a sealing member 16 having an inner diameter smaller than an outer diameter of a pipe to be inserted in the adapter 1. This embodiment allows for a tight compression fit between the sealing member 16 and an inserted pipe, wherein the compression fit prevents gas leakage for various pressures of gas (e.g. flue gas) moving through an inserted pipe in the adapter 1. In certain embodiments, the sealing member 16 may comprise a single sealing ring or a double sealing ring, typically made of a resilient, rubber-like material. The double sealing ring may provide additional safety to comply with more stringent safety and regulatory requirements.

In a further embodiment, the adapter 1 may further comprises a mounting flange 18 disposed between the first end 2 and the second end 4. The mounting flange 18 circumvents the use of separate mounting brackets, thereby simplifying the installation of the adapter 1 through a wall or roof decking. In typical embodiments the mounting flange 18 may comprise one or more apertures 19 for connecting the adapter 1 by means of e.g. screws and/or bolts.

The mounting flange 18 of the present invention is also advantageous in view of providing a sealed engagement of the mounting flange 18 with e.g. a wall or roof. To that end the mounting flange 18 of the present invention may further comprise a flange sealing member 22, which is typically configured to provide a compression fit between the mounting flange 18 and a mounting surface of e.g. a wall or roof decking. The flange sealing member 22 ensures an air tight connection between the adapter 1 and the mounting surface, even if the mounting surface comprises irregularities. Having such an air tight connection reduces drafts that could transport a significant amount of heat out of a building. In a typical embodiment, the flange sealing member 22 may be a sealing ring disposed around the first end 2 of the adapter 1 at the mounting flange 18. The flange sealing member 22 may be made of a resilient rubber-like material.

In an embodiment, the adapter 1 may further comprise a plurality of externally disposed reinforcement ribs 24. The reinforcement ribs 24 provide stiffness against bending forces that may be caused by an inserted pipe. Furthermore, in case the adapter 1 comprises the mounting flange 18, the reinforcement ribs 24 may reduce bending stress and strain in the second end 4 near the mounting flange 18, thereby preventing damaging the adapter 1 in case an inserted pipe is poorly aligned with the adapter 1. For example, the reinforcement ribs 24 may be externally and circumferentially disposed at the second end 4 and connected to the mounting flange 18. This provides stiffness to the second end 4 as well as the mounting flange 18.

Figure 3:
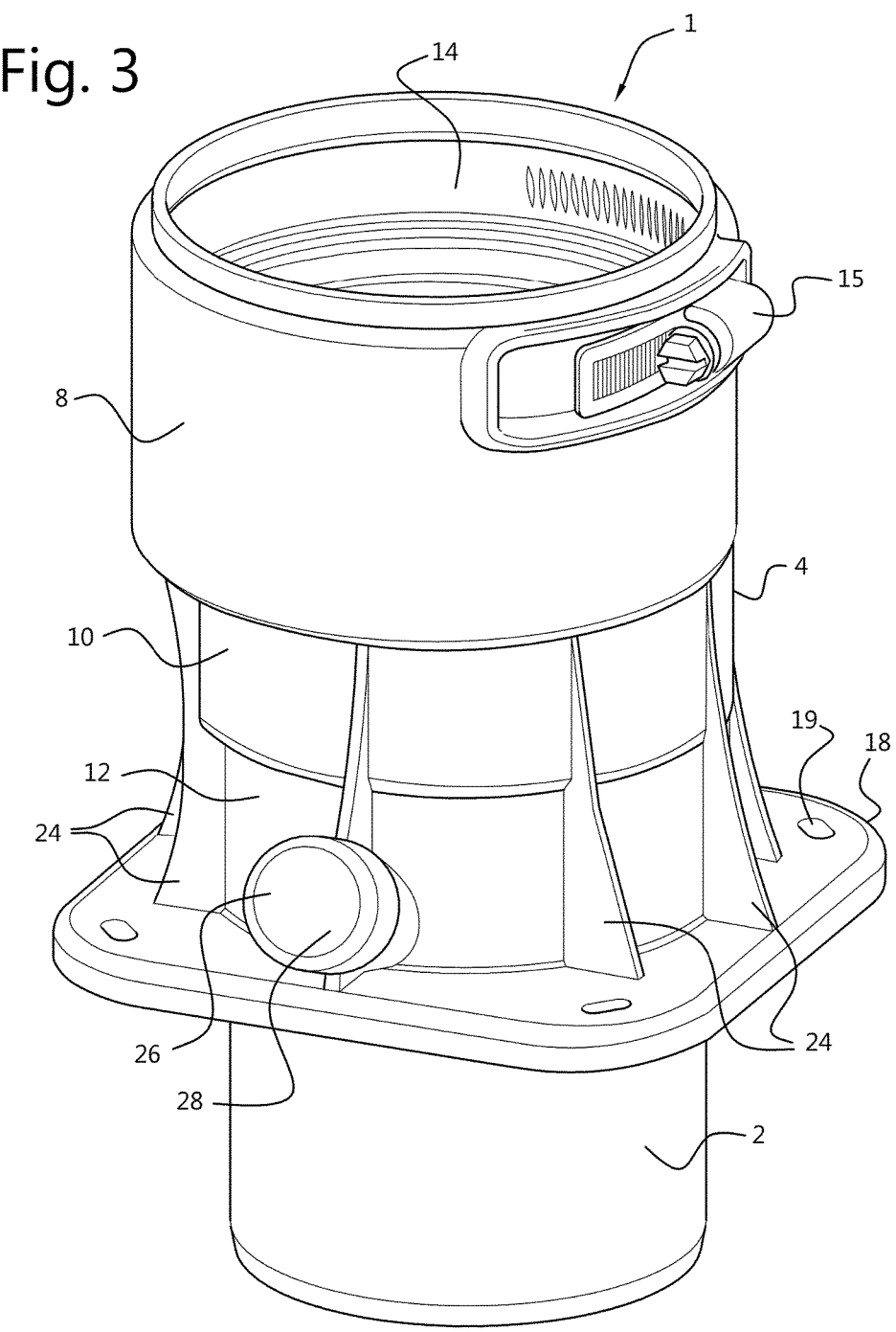
FIG. 3 shows a three dimensional view of an adapter according to a present invention embodiment.

FIG. 3 shows a three dimensional view of an adapter according to a present invention embodiment. In the embodiment shown the pipe securing member 14 is depicted as a screw clamp provided with a tightening member 15, which is externally accessible and manually operable. The pipe securing member 14 is disposed at the second end 4, in particular at a cylinder shaped wall 8 having a largest internal diameter. To provide sufficient clamping action for each pipe diameter of an inserted pipe, the tightening member 15 is disposed at a line or point of tangency of the at least two cylinder shaped walls 8, 10, 12 as depicted in FIG. 2. This allows the screw clamp to pull an inserted pipe to the line or point of tangency T for securing an inserted pipe to the adapter 1.

In an embodiment, the second end 4 may further comprise a drain member 26, which provides access to the inside of the adapter 1 for e.g. draining possible built-up of condensation. Advantageously, the drain member 26 may comprise a releasable cap 28, such as a screw cap for quick access and/or drainage of water condensate.

The present invention embodiments have been described above with reference to a number of exemplary embodiments as shown in the drawings. Modifications and alternative implementations of some parts or elements are possible, and are included in the scope of protection as defined in the appended claims.

The invention claimed is:

1. An adapter for a flue gas outlet, comprising:
a first end, a second end, and a central passageway extending between the first end and the second end,
the second end being of unitary construction and comprises a stepped profile of at least two interconnected cylinder shaped inner walls having different internal diameters, each cylinder shaped inner wall being arranged for sealed engagement with a corresponding pipe to be inserted into the adapter, wherein an internal diameter of the at least two cylinder shaped inner walls decreases with increased insertion depth as measured from the second end toward the first end,
wherein the at least two cylinder shaped inner walls are eccentrically disposed with respect to a transverse plane of the adapter and mutually tangent at a point of tangency of the at least two cylinder shaped inner walls in a longitudinal direction of the adapter, and
a pipe securing member circumferentially disposed at the second end, wherein the pipe securing member is configured to pull an inserted pipe to the point of tangency.

2. The adapter of claim 1, wherein the pipe securing member is mutually tangent to each of the at least two cylinder shaped inner walls in the longitudinal direction.

3. The adapter of claim 1, wherein the pipe securing member is disposed at a cylinder shaped inner wall having the largest internal diameter.

4. The adapter of claim 1, wherein the pipe securing member is a screw band clamp.

5. The adapter of claim 1, wherein the pipe securing member is a spring clamp.

6. The adapter of claim 1, where the pipe securing member comprises a manually operable tightening member.

7. The adapter of claim 6, wherein the tightening member is externally accessible.

8. The adapter of claim 6, wherein the tightening member is disposed at a point of tangency of the at least two cylinder shaped inner walls.

9. The adapter of claim 1, wherein each of the at least two cylinder shaped inner walls comprises a sealing member having an inner diameter smaller than an outer diameter of a pipe to be inserted in the adapter.

10. The adapter of claim 1, wherein the adapter further comprises a mounting flange disposed between the first end and the second end.

11. The adapter of claim 10, wherein the mounting flange further comprises a flange sealing member.

12. The adapter of claim 11, wherein the flange sealing member is a sealing ring disposed around the first end of the adapter at the mounting flange.

13. The adapter of claim 1, wherein the adapter further comprises a plurality of externally disposed reinforcement ribs.

14. The adapter of claim 1, wherein the adapter is made of plastic, aluminium or stainless steel.

15. The adapter of claim 1, wherein an inner diameter of each of the at least two cylinder shaped walls is larger than 40 mm and smaller than 400 mm.

* * * * *